Figure 1:
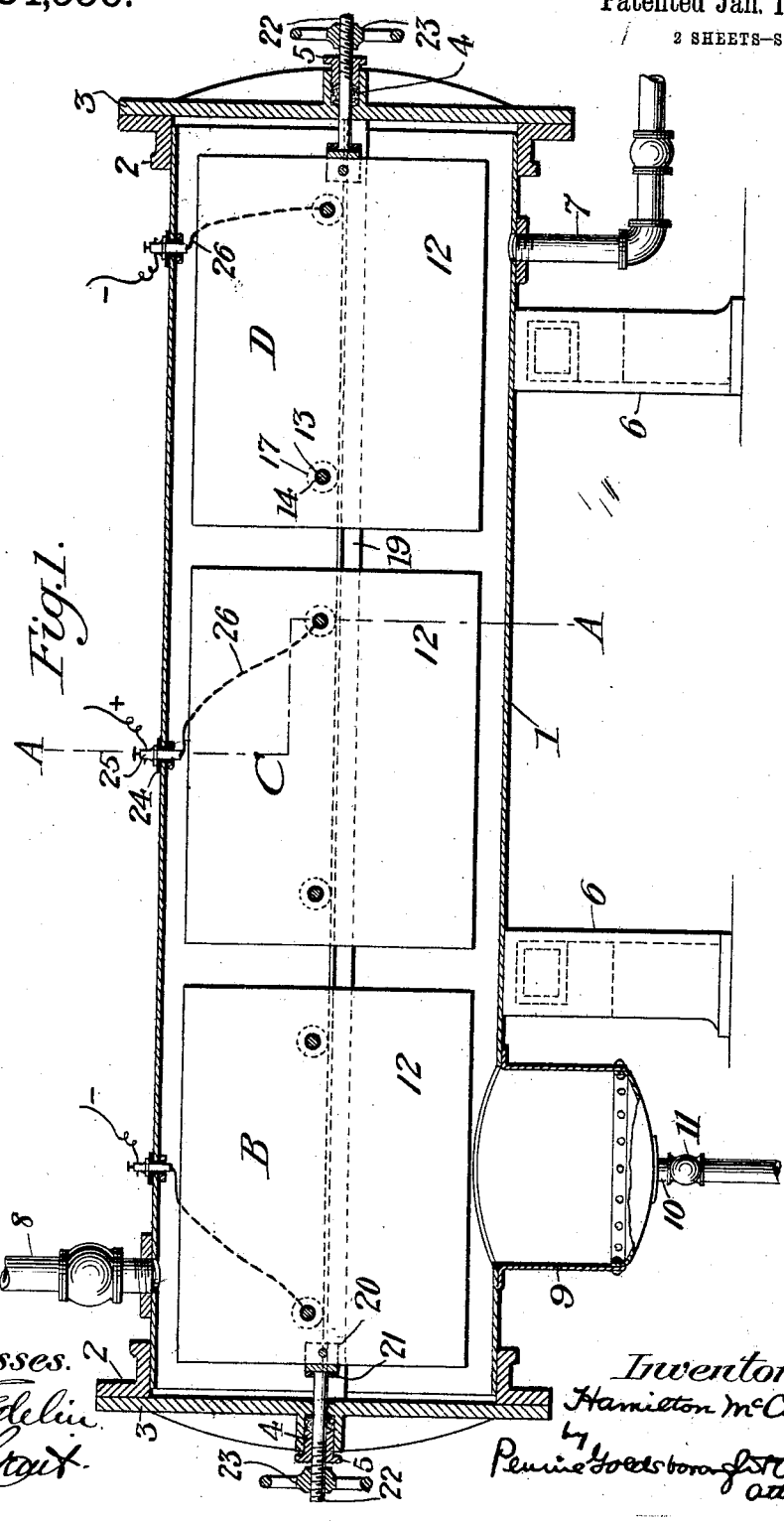

H. McCUBBIN.
ELECTROLYTIC APPARATUS FOR THE CLARIFICATION OF SUGAR SOLUTIONS.
APPLICATION FILED SEPT. 16, 1911.

1,084,556.

Patented Jan. 13, 1914.

2 SHEETS—SHEET 1.

Witnesses.
O. W. Edelin
R. C. Stait

Inventor:
Hamilton McCubbin
by
Pennie Goldsborough & O'Neill
attys.

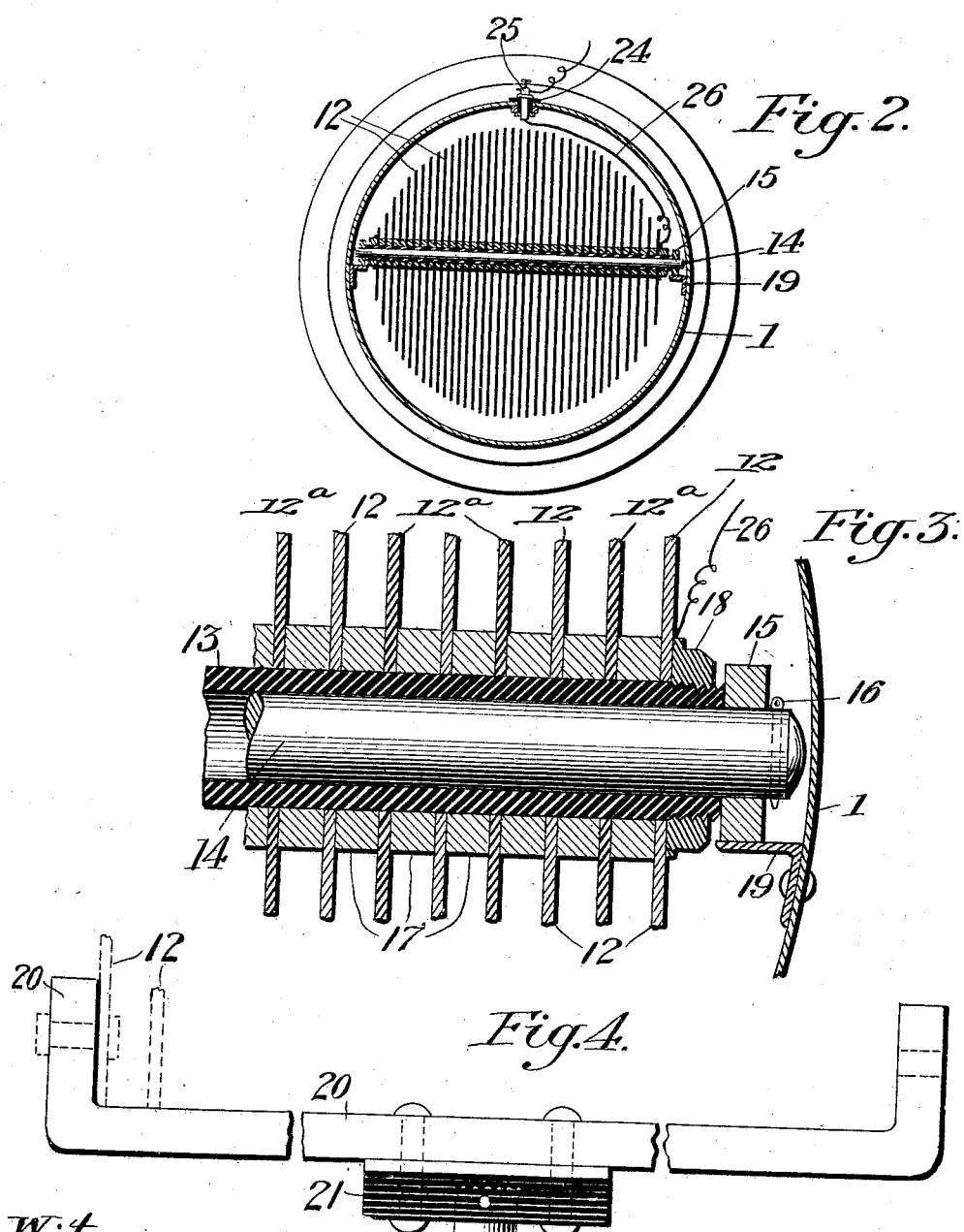

UNITED STATES PATENT OFFICE.

HAMILTON McCUBBIN, OF LAHAINA, TERRITORY OF HAWAII.

ELECTROLYTIC APPARATUS FOR THE CLARIFICATION OF SUGAR SOLUTIONS.

1,084,556.  Specification of Letters Patent.  Patented Jan. 13, 1914.

Application filed September 16, 1911. Serial No. 649,654.

*To all whom it may concern:*

Be it known that I, HAMILTON McCUBBIN, a citizen of the United States, residing at Lahaina, in the county of Maui, Territory of Hawaii, have invented certain new and useful Improvements in Electrolytic Apparatus for the Clarification of Sugar Solutions; and I do hereby declare the following to be a full, clear, and exact description of the invention, such as will enable others skilled in the art to which it appertains to make and use the same.

This invention relates to the clarification of sugar solutions and solutions having similar characteristics; and the object of the invention is to produce apparatus for clarifying such solutions in a continuous, rapid and efficient manner.

The invention contemplates treating the solution electrically while it is passed through a container within which are electrodes connected to an electric circuit and exposing large surfaces with which the solution comes in contact during its passage through the container. Means are provided for adjusting the relative positions of the electrodes with respect to each other, and the ends of the container are preferably made removable to permit the withdrawal of the electrodes from the container for cleaning. Means are also provided for the collection and for the removal of the sediment and impurities precipitated in the container.

By means of apparatus substantially as described, using a 100 volt direct current, I have increased the purity of sugar solutions over 6% by a single treatment.

One form of clarifying apparatus embodying my invention is illustrated in the accompanying drawings, forming a part of this specification, in which—

Figure 1 is a longitudinal sectional elevation. Fig. 2 is a section on the line A—A of Fig. 1. Fig. 3 is a detail on a larger scale of a portion of Fig. 2. Fig. 4 is a detail showing in plan a strap with insulating block to which the bolt for adjusting the position of an electrode is secured.

Referring to the drawings, the circular shell 1 of the container is provided at its ends with the flanges 2 to which the heads 3 are removably attached. At the center of each head 3 is a stuffing box 4 with gland 5. The shell 1 is supported by the stands 6. An inlet pipe 7 for the solution to be treated is provided at the bottom of the shell 1 near one end, and an outlet pipe 8 on the top of the shell 1 near the opposite end. A mud drum 9 is provided on the bottom of the shell 1 near its end having the outlet pipe 8. The bottom of the mud drum 9 has a pipe 10 with cock 11 for discharging the sediment collected in said mud drum.

Three electrodes are illustrated, the middle electrode C is the anode and B and D are the cathodes. The electrodes are similarly composed of parallel vertical plates, preferably of iron plates 12 and zinc plates 12$^a$ arranged alternately. Each plate is provided with two holes for the insulating tubes 13. A metal rod 14 is fitted inside of each tube 13, and a wheel 15 is adapted to turn on each end of the rod 14, between the end of the tube 13 and a cotter pin 16. Washers 17 preferably made of non-corrosive electrically conducting material such as aluminum are provided over the tubes 13 and interposed between the plates 12 and 12$^a$. The ends of the tubes 13 may be threaded to receive nuts 18. Angle iron bars 19 are secured longitudinally on opposite sides inside of the shell 1 to form a track or guide-way upon which the wheels 15 are adapted to ride and support the electrodes. A strap 20 is secured to the end of the plates nearest the heads 3 of the electrodes B and D. A block 21 of insulating material is attached to the middle of each strap 20 and a bolt 22 preferably of bronze is fastened to each block 21. The bolts 22 are passed through the stuffing box 4 with gland 5, and a hand wheel 23 with threaded hub is provided for each of these bolts outside of the head 3. Insulating bushings 24 are secured to the top of the shell 1 in which are binding posts 25 to which connections are made inside the shell by wires 26 to the electrodes B, C and D respectively and outside of the shell to a direct current electric generator.

In operation, the solution to be treated is forced either by gravity or by a pump through the container, entering by the inlet pipe 7 and leaving by the outlet pipe 8, encountering during its passage the large surfaces of the plates 12 of the electrodes which are connected to the generator such that the current flows through the solution from the middle electrode or anode C to the electrodes or cathodes B and D. Due to the fact that iron and zinc plates are employed in both the anodes and cathodes, a galvanic action is produced between the plates in addition to the extraneous current between the electrodes. As the solution enters the container through the inlet pipe 7, it comes into contact with the large surfaces of the plates of the electrodes, where it is subjected to a galvanic action caused by the fact that alternating iron and zinc plates are used. It has been found in practice with sugar solutions, that when the plates were all iron or all zinc, the effect was not as great as when they were alternated. By operating the hand wheels 23 the position of the cathodes may be altered with respect to the anode. The resistance of the circuit may thus be regulated, and consequently the current passing through the solution, as may be determined by ammeter readings. Usually from 50 to 85 amperes are passed through the solution depending upon the size of the apparatus and the solution being treated. The sediment and impurities precipitated are carried by the flow of the solution and collect in the mud drum 9 from which they are removed by opening the cock 11.

I claim:

1. Apparatus for the clarification of sugar solutions and the like, comprising a completely inclosed container through which the solution is forced, electrodes within the container connected to an electric generator outside of the container, and means operable from the exterior of the container for adjusting the electrodes with respect to each other, to vary the distance between their lateral edges.

2. Apparatus for the clarification of sugar solutions and the like, comprising a shell with a head bolted to each end, an inlet on the bottom near one end, an outlet on the top near the opposite end, a mud drum with discharge pipe on the bottom of the shell near the end under the outlet, electrodes supported within and insulated from the shell, means for connecting the electrodes with a dynamo, and means operable from the exterior of the container for adjusting the relative positions of the electrodes.

3. In apparatus for the clarification of sugar solutions and the like, an electrode having parallel vertical flat plates washers separating said plates and wheels separating the plates to permit longitudinal movements thereof, the plates being electrically connected but insulated from the wheels.

4. Apparatus for the clarification of sugar solutions and the like, comprising a container, electrodes mounted in said casing for movements longitudinally of the casing and means operable from the exterior of the container to adjust the longitudinal relative positions of said electrodes, so as to vary the distance between their lateral edges.

5. Apparatus for the clarification of sugar solutions and the like, comprising a container, longitudinal guide-ways within the container, electrodes movably supported on said guide-ways, said electrodes comprising a plurality of laterally spaced plates, transverse supporting members for said plates, the exterior of said supporting members adapted to be supported by said guide-ways.

6. An apparatus for the clarification of sugar solutions and the like, comprising a container, an intermediate electrode mounted in said container, end electrodes movably mounted for longitudinal movements in said container and means acting on said end electrodes and operable from the exterior of the container to adjust the longitudinal positions of the said end electrodes.

In testimony whereof I affix my signature, in presence of two witnesses.

HAMILTON McCUBBIN.

Witnesses:
ROBT. J. PRATT,
P. H. BURNETTE.